Dec. 27, 1955 S. WESTLUND 2,728,116
ARRANGEMENT IN WINDOWS
Filed Feb. 4, 1952

Inventor:-
Sven Westlund,
By
Pierce, Scheffler + Parker,
Attorneys.

United States Patent Office 2,728,116
Patented Dec. 27, 1955

2,728,116
ARRANGEMENT IN WINDOWS
Sven Westlund, Soderala, Sweden
Application February 4, 1952, Serial No. 269,712
3 Claims. (Cl. 20—40.5)

The present invention refers to an arrangement particularly in double windows to reduce or to prevent misting of the same. In ordinary double windows, these are frequently subjected to misting in cold weather by reason of the fact that the moisture of the air between the windows is condensed on the cold outer pane, when a point below the dew-point is reached. Such misting may assume annoying proportions and may freeze to ice in severe cold, the ice then entirely preventing the visibility through the windows as long as the cold weather lasts. Furthermore, the condensation may become so abundant that the water flows down the pane and out through chinks so as to cause damage.

The arrangement in windows according to the invention has for its object to prevent or to reduce these drawbacks, and the invention is substantially distinguished by an intermediate pane inserted between two other panes, which are tightly secured circumferentially in a window-sash, said intermediate pane being made at the top and the bottom with a substantially horizontal elongated opening between the edge of the pane and the inside of the window-sash facing the pane, whereby direct communication is provided between the two spaces separated by the intermediate pane. Said third pane then serves as a partition which brings about an air circulation within the window and prevents or reduces the condensation of moisture. The air layer located between the third pane and the outer pane will be cooled down relatively uniformly, and is caused to sink downwardly, whereas the air layer located between the third pane and the inner pane is heated so as to be caused to rise upwardly. On account of the openings left at the top and the bottom between the pane and the window-sash, the air can circulate between the inner and outer layers and will never have time to become cooled down below the dew-point.

Figure 1:
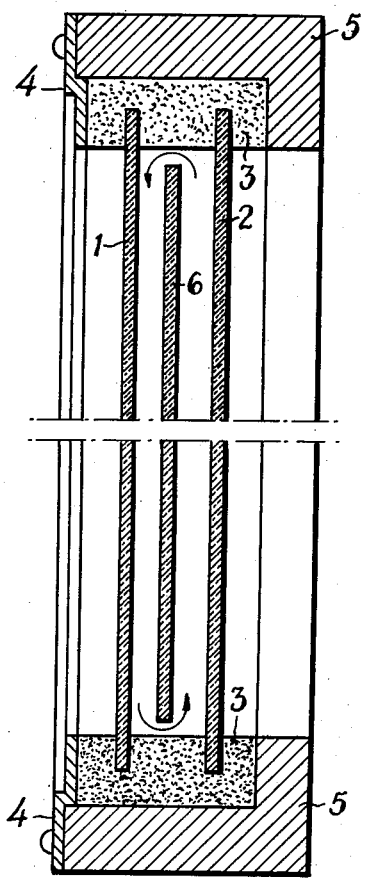
Figure 2:
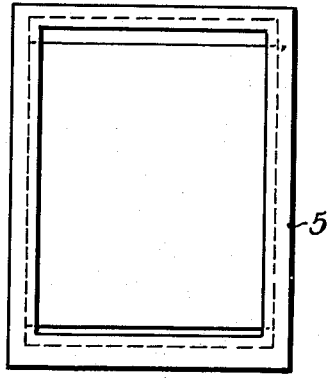
Figure 3:
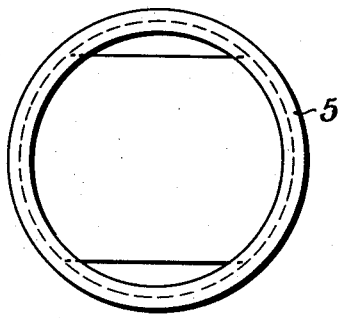
Figure 4:
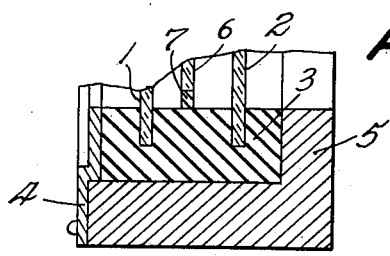

A window constructed according to the invention will be described hereinafter as an example of embodiment, and is illustrated in the accompanying drawing, wherein Fig. 1 shows a vertical broken cross section of a window according to the invention. Fig. 2 shows a rectangular window of this type viewed from the front, and Fig. 3 shows a round window according to the invention. Fig. 4 is a fragmentary view similar to Fig. 1 and illustrating a modified embodiment of the invention.

In the window according to Fig. 1, the outer pane 1 and the inner pane 2 are fitted into grooves in a rubber fillet 3 extending circumferentially about the panes while being pressed against the window-sash 5 by means of a fitting 4. Inserted between the outer pane 1 and the inner pane 2 is a third pane 6, which is inserted along the vertical sides of the window into grooves provided in the rubber fillet 3, while terminating at a distance of a few millimeters from the rubber fillet at the horizontal sides of the window, so that an opening is produced between the horizontal edges of the pane and the rubber fillet 3. The size of this opening is adapted so that a suitable circulation is obtained. If the circulation becomes too small, the air will have time to become cooled down below the dew-point at the outer pane 1, and if the circulation becomes too intense, the heat-insulating properties of the window will be impaired.

In experiments it has been found that the best result is obtained, if the intermediate pane is not placed right between the inner and outer panes but displaced in a direction toward the outer pane.

The arrangement is applicable not only in ordinary rectangular windows, as in Fig. 2, but also in round windows, for example, as in Fig. 3, the intermediate pane being then cut horizontally, if desired, as shown in the drawings, or arcuately to provide for an effective ventilation opening.

The window described above and illustrated in the drawing only constitutes an example of embodiment according to the invention, and may be varied with respect to its details and its construction, without the inventive idea being departed from. Thus it is not necessary to have the panes fitted into rubber fillets; the arrangement is just as applicable in ordinary windows having bearing surfaces in the sashes, against which the glass pane is pressed by means of wooden fillets and/or by cementation. Finally, the inventive idea may also be applied by the arrangement of a plurality of panes between the inner and outer panes. The intermediate pane should then be made with a single ventilation opening arranged at one pane at the top, for example, and at the next pane at the bottom, and so forth, so that the air is compelled to flow through all intermediate spaces in succession. A communication will then have to be provided between the outermost and the innermost spaces to bring about circulation. It may also be advantageous in a window according to the invention to make use of some moisture-absorbing means such as silica gel or the like, that keeps the circulating air in a dry condition and reduces the risk of condensation of the panes. The moisture-absorbing means may then be placed at the bottom of the window, and if it be sufficiently porous and pervious to air, it may be permitted to cover the lower opening as shown at 7 in Fig. 4, whereby a reduced circulation, which is sometimes desirable, may also be obtained. Means that are solely adapted to suppress circulation, such as cotton and the like, may also be brought into use.

What I claim is:

1. A multi-paned window comprising a window sash, outer and inner window panes secured circumferentially in said sash in parallel spaced relation to establish an air chamber therebetween, and a third window pane located intermediate and generally parallel with said outer and inner panes, said intermediate pane extending to and being secured along the sides thereof to the side portions of said sash but having its upper and lower edges terminated short of the top and bottom portions respectively of said sash thereby to establish upper and lower openings only between the top and bottom portion of said sash and the upper and lower edges respectively of said intermediate pane thereby to provide for continuous circulation of air in vertical paths only upwardly and through the space between said inner and intermediate panes and thence downwardly and through the space between said outer and intermediate panes.

2. A multi-paned window as defined in claim 1 wherein said intermediate pane is located nearer to said outer pane than to said inner pane.

3. A multi-paned window as defined in claim 1 and which further includes means pervious to air arranged in the space between the bottom portion of said sash and the lower edge of said intermediate pane for reducing the vertical air circulation in the spaces respectively between said intermediate pane and said outer and inner panes.

References Cited in the file of this patent

UNITED STATES PATENTS

| 2,216,892 | Robinson | Oct. 8, 1940 |
| 2,225,809 | Walker | Dec. 24, 1940 |
| 2,257,948 | Green | Oct. 7, 1941 |
| 2,625,640 | Gaiser et al. | Jan. 13, 1953 |